US 6,550,118 B2

(12) United States Patent
Smith et al.

(10) Patent No.: US 6,550,118 B2
(45) Date of Patent: Apr. 22, 2003

(54) APPARATUS AND METHOD FOR ACCURATE COUNTERSINKING AND RIVET SHAVING FOR MECHANICAL ASSEMBLY OPERATIONS

(75) Inventors: Scott O. Smith, Seattle, WA (US); Todd W. Rudberg, Mukilteo, WA (US)

(73) Assignee: Electroimpact, Inc., Mukilteo, WA (US)

( * ) Notice: Subject to any disclaimer, the term of this patent is extended or adjusted under 35 U.S.C. 154(b) by 0 days.

(21) Appl. No.: 09/775,735

(22) Filed: Feb. 2, 2001

(65) Prior Publication Data
US 2002/0104207 A1 Aug. 8, 2002

(51) Int. Cl.[7] .......................... B23Q 15/00; B23C 1/16; B23B 39/08
(52) U.S. Cl. ................ 29/26 A; 408/1 R; 408/11; 409/132; 409/193; 409/194; 700/159
(58) Field of Search ................... 29/26 A, 27 C, 29/558; 409/185–194, 131, 132; 318/569–571; 408/1 R, 10, 11, 16, 97; 250/204; 700/159

(56) References Cited

U.S. PATENT DOCUMENTS

| 3,562,538 | A | * | 2/1971 | Mergler | 250/204 |
| 4,657,451 | A | * | 4/1987 | Tanaka | 324/207.17 |
| 4,966,323 | A | * | 10/1990 | Speller et al. | 227/111 |
| 5,094,574 | A | * | 3/1992 | Nishigai et al. | 408/1 R |
| 5,123,789 | A | * | 6/1992 | Ohtani et al. | 408/1 R |
| 5,139,376 | A | * | 8/1992 | Pumphrey | 408/1 R |
| 5,404,021 | A | * | 4/1995 | Mangano et al. | 250/559.26 |
| 5,505,005 | A | * | 4/1996 | McMurtry et al. | 33/558 |
| 5,740,081 | A | * | 4/1998 | Suzuki | 700/159 |
| 5,827,020 | A | * | 10/1998 | Fujita et al. | 318/571 |
| 6,015,249 | A | * | 1/2000 | Sacchetti | 408/10 |

FOREIGN PATENT DOCUMENTS

| JP | 5715648 | * | 1/1982 | 409/186 |
| JP | 411347818 | * | 12/1999 | 409/186 |

* cited by examiner

Primary Examiner—William Briggs
(74) Attorney, Agent, or Firm—Jensen & Puntigam, P.S.

(57) ABSTRACT

The apparatus and method includes a spindle portion which holds a cutting tool. The drill is initially moved forwardly of a pressure foot portion of the apparatus. The pressure foot portion is then moved forwardly along with the spindle and drill to clamp the mechanical assembly. A thrust control arrangement produces a reduction of the thrust on the tool holder such that as the assembly is being clamped, the tool initially contacts the workpiece and then remains stationary while the pressure foot moves forward to complete clamp-up. The positions of the tip of the tool and the surface of the workpiece are recorded and compensation is then made to the apex position of the spindle stroke, using a previously determined reference position of the tool relative to the workpiece.

19 Claims, 10 Drawing Sheets

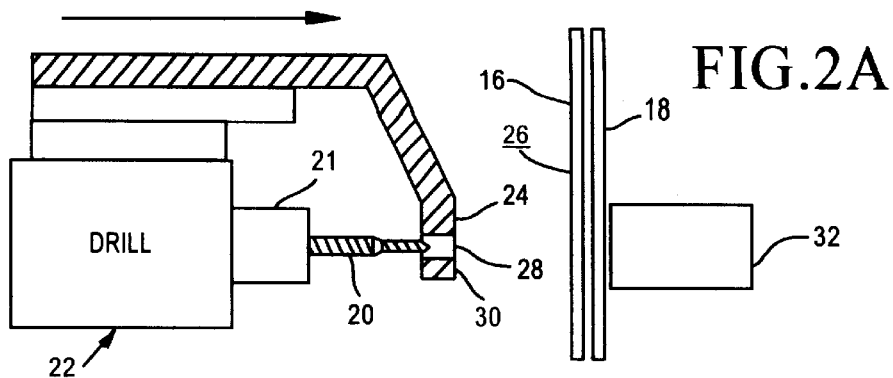
FIG.2A
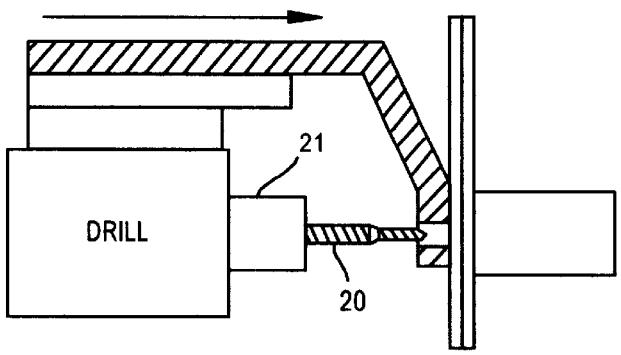
FIG.2B
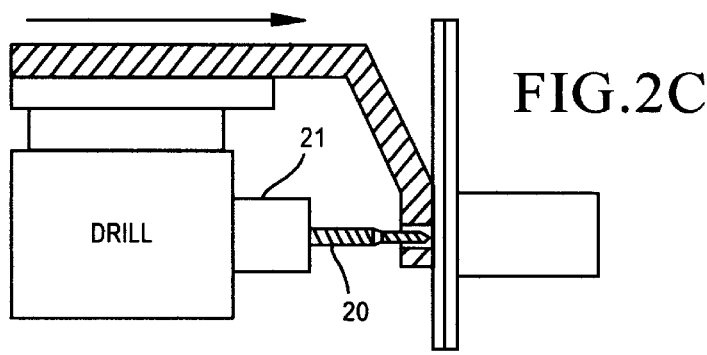
FIG.2C
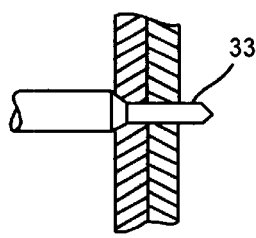
FIG.2E
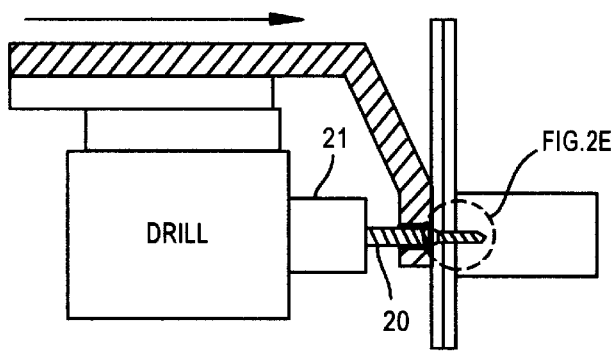
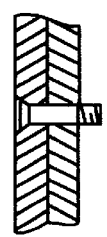
FIG.2F
FIG.2D

US 6,550,118 B2

APPARATUS AND METHOD FOR ACCURATE COUNTERSINKING AND RIVET SHAVING FOR MECHANICAL ASSEMBLY OPERATIONS

TECHNICAL FIELD

This invention relates generally to assembly machines which drill/countersink openings in aircraft skins and other large assemblies and which shave the tops of rivets which have been previously installed in such openings, and more specifically concerns such a machine which has the capability of compensating for changes in the apex (farthest point) of the stroke of the spindle which holds the drill/shave tools caused by mechanical and thermal effects encountered during operation of the machine.

BACKGROUND OF THE INVENTION

Large, complex assembly machines, such as shown in U.S. Pat. Nos. 5,033,174 and 5,699,599, are used to manufacture large mechanical assemblies, such as the wing portion of large commercial aircraft. The assembly machines perform operations which include drilling holes in the mechanical assemblies for insertion of rivets and bolts to serve two or more parts of an assembly together, such as the skin and struts of an aircraft wing. These operations, involving the use of tools which rotate at high speeds, include drill-countersink operations, drill-chamfer operations and drill-rivet shave operations. A high degree of accuracy in the above three operations is quite important in many assembly operations, particularly those involving large aircraft assemblies, for which the present invention was designed.

The outside surface of an aircraft, referred to as the aircraft skin, is desirably flat and smooth. This reduces drag and hence fuel consumption when the aircraft is in operation. Further, such characteristics of the aircraft skin are important to aircraft appearance and resulting customer satisfaction. For these reasons, very accurate machine operations on the skin of aircraft assemblies such as wings are quite important. For instance, for bolt installations which require a countersink, the tolerance for the countersink, including the manufacturing tolerance in the bolt, must be such that the resulting dimensional variance between the skin and the surface of the bolt is within the range of 0.000 to −0.007, for a tolerance of ±0.0035. Since the bolt manufacturing tolerance is ±0.002 inches, the resulting tolerance for the depth of the countersink is ±0.0015.

Another machine operation involves riveting. In riveting operations, skin surface smoothness is controlled by rivet shaving. Rivet head shaving operations in aircraft assembly must typically be within a dimensional range of 0 to +0.002, for a tolerance of ±0.001, between the skin surface and the head surface of the shaved rivet.

While the primary focus of this invention is directed toward highly accurate machine operations, including drill countersink and rivet shaving on aircraft skin surfaces, it should be understood that the invention is also applicable for determining tool position relative to the workpiece for other tools used in the manufacture of other large assemblies where high accuracy is important. For instance, a precision chamfer is necessary in many aircraft (and other) assembly situations for a proper, tight interference fit between the inside corner of bolts, i.e. the area where the head of the bolt meets the shank, and the opening in the workpiece.

Accordingly, accurate control over drilling operations, including knowledge and control over the farthest point of movement of the tool, referred to herein as the apex point, and the ability to compensate for changes due to various operating factors, is quite important in achieving the objectives of accurate machine operations.

The location of the tip of the machine tool at the end of the spindle stroke determines the depth of the machine operation, i.e. countersink, chamfer or shaving. Again, this depth must be controlled quite accurately because of the extremely tight tolerances described above for such operations.

In basic operation of such an assembly machine, a cutting tool such as a drill with a countersink or chamfer arrangement, or a shaver, is mounted in a spindle assembly. The spindle assembly typically includes a servo-controlled ball screw or a servo-controlled linear motor to move the tool holder portion of the spindle toward the workpiece in a controlled manner. In some cases, a linear scale mechanism is included as part of the spindle assembly to increase accuracy. Existing systems, however, are subject to both mechanical and thermal changes and/or errors, which decrease accuracy. Mechanically, such changes/errors include contact errors between the face of the pressure foot of the machine tool and the skin surface of the assembly. In addition, chip residue from the drilling operation can accumulate between the pressure foot and the skin surface. Curvature or other variation in the shape of the work surface, including deflection and/or rotation of the pressure foot, can also produce mechanical errors.

Another source of error is change in temperature of the spindle assembly, which results in what is referred to as thermal growth of the various portions of the spindle assembly. The dimensions of the spindle assembly will actually change sufficiently because of increase in temperature to affect the accuracy of machine operations. Thermal growth occurs throughout the spindle assembly and is not necessarily uniform or continuous along the length of the spindle assembly, due to various factors, as described in more detail below.

In existing systems, the control computer for the machine has the capability of evaluating thermal data from temperature sensors and the like positioned on the spindle assembly, and can adjust the spindle stroke accordingly. However, it is quite difficult to position temperature sensor(s) on the rotating spindle shaft portion of the assembly. Temperature gradients and discontinuities and the resulting growth in the various portions of the spindle assembly are difficult to predict and hence measure and thus are very difficult if not impossible to compensate for.

While certain techniques have been developed to counter/compensate for the effects of thermal growth and mechanical errors, they have proven to be not very effective, particularly in meeting close tolerance requirements. For instance, attempts to control temperature include cooling the spindle during operation, or running the spindle (warm-up) for a considerable time prior to use. Other possibilities include using a linear scale, as indicated above, relative to the feeding of the spindle to eliminate errors back of the readhead, as well as attempting to measure temperature fluctuations at various points along the spindle assembly and compensating for the resulting tool length variations.

The biggest issue with thermal growth concerns the tool holder and the actual tool or cutter. When the tool holder and the cutting tool stop turning, they increase in temperature due to heat conducted forwardly from the spindle body. Once the machine is in operation, however, the tool holder and cutter are exposed to a "wind" effect created by the high speed turning of those elements. This effect is the source of a thermal discontinuity which results in the compensation for tool length changes using existing thermocouples not matching the actual thermal growth of the tool.

It has proven difficult to effectively cool those portions of the spindle assembly when the system is not in operation, and keeping the tool running for a substantial period of time prior to actual use is undesirable due to energy and safety considerations. It is preferred that the tool be running only when it is actually used for cutting. Further, it is very difficult, if not impossible, to measure the temperature of the forward portions of the spindle assembly, i.e. the tool holder and the tool itself, which, depending upon the particular operation, can be turning at between 6,000 and 20,000 rpm.

Hence, it is desirable to be able to determine and compensate for the apex position of the tip of the cutting tool during the spindle stroke. For best results, both mechanical and thermal sources of change must be determined and compensated for.

DISCLOSURE OF THE INVENTION

Accordingly, the present invention is an apparatus and corresponding method for performing accurate machine operations on mechanical assemblies, comprising: a first spindle for holding a cutting tool for performing very accurate machine cutting operations, such as countersunk holes; a moving assembly for moving the first spindle toward and away from a workpiece, the workpiece comprising at least two workpiece elements which are to be joined together, the workpiece having a near surface relative to the cutting tool, wherein the cutting tool has an apex position in its movement relative to the workpiece; a pressure foot assembly for clamping the workpiece elements and stabilizing them in a fixed position, wherein the pressure foot assembly has an aperture through which the cutting tool can move to contact the workpiece; an element which is mountable on the first spindle for determining the position of the near surface of the workpiece relative to the cutting tool along a line which is coincident with the central axis of the cutting tool; and means for adjusting the apex position of the cutting tool in accordance with the determined position of the workpiece relative to the cutting tool to achieve a very accurate cutting operation in the workpiece.

BRIEF DESCRIPTION OF THE DRAWINGS

FIG. 2 is a series of views showing a drill/countersink process.

BEST MODE FOR CARRYING OUT THE INVENTION

Figure 1:
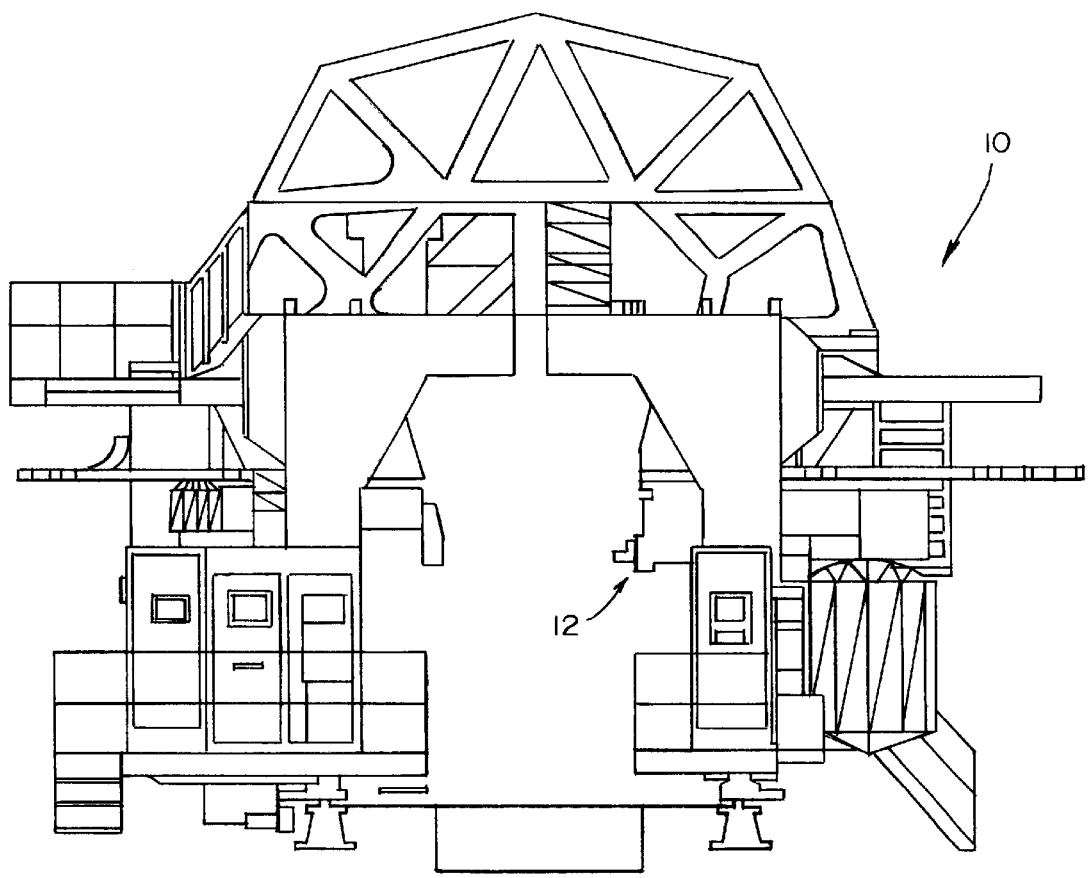
FIG. 1 is a simplified drawing of a large-scale assembly system.

FIG. 1 shows an assembly, generally yoke-shaped, for large-scale assembly operations, such as the manufacture of wings for commercial aircraft. The yoke assembly, referred to generally at 10, extends over the wing being manufactured (not shown). The yoke assembly includes a set of tools 12 which includes two side-by-side horizontally positioned spindles, which move toward and away from the skin surface of the upright wing positioned within yoke assembly 10. The horizontal (in and out) movement of either of the two spindles, which are part of a spindle assembly, is referred to as a spindle stroke. The farthest reach of the tool held in the spindle during its in and out movement is referred to as the apex of the spindle stroke. In the embodiment shown, one of the spindles is used with a tool for drilling, either with countersink and/or chamfer portion, while the other spindle is used with a tool for shaving rivet heads.

The yoke structure 10, shown generally in FIG. 1, is described in detail in U.S. Pat. No. 5,699,599, which is owned by the assignee of the present invention, the contents of said patent being hereby incorporated by reference. The complete structural details of the yoke assembly 10 and the set of tools 12 for performing the machine operations, with the spindle assembly and its two spindles, are thus not disclosed in detail herein.

FIGS. 2a–2f show in simplified form the operation of a drilling operation on a workpiece. Referring to FIG. 2a, two parts, such as a wing skin member and a wing strut, to be joined by a rivet or bolt, are shown at 16 and 18. A countersink drill is shown at 20. The countersink drill is held by a tool holder 21, which is rotated by a motor in the spindle assembly, shown generally at 22.

The tool assembly 12 includes a pressure foot member 24, which in operation is pressed against the outer (skin) surface 26 of skin member 16. Typically, the pressure foot member which contacts the skin member is approximately 1-inch wide, with a ½-inch diameter aperture 28 through which the drill moves in the stroke process. Pressure foot 24 can have various configurations, including rectangular, circular and other arrangements. Further, while aperture 28 is usually central, it can be located at different positions within the pressure foot to allow clearance for particular workpiece configurations. The pressure foot 24 typically has a flat forward surface 30 which, in normal operation, abuts against surface 26 of the skin member.

In general operation, a drill or other tool mounted in a tool holder portion of the spindle assembly moves through aperture 28 under the control of a motor or other motive element for moving spindle assembly 22 horizontally back and forth (toward and away) relative to the workpiece. In the embodiment shown, a drill tool mounted on a first spindle moves through the aperture, against the workpiece, drilling a hole with a desired countersink or chamfer. Following the drilling of the hole, a riveting apparatus is moved into place and inserts a rivet into the opening and then upsets the rivet. Then, the second spindle which is adjacent the first spindle is moved into place and the shave tool mounted therein is moved toward the workpiece to shave the exposed rivet head flush with the surface of the skin element.

Now more specifically, the machine, after proper positioning and determination of the nominal position of the drill relative to the two-part workpiece, will move the pressure foot 24 against the workpiece with a clamp-up pressure of between 200–2,000 pounds. Typically, a structural element, such as backup pad 32, is positioned on the opposing (underside) surface of the workpiece. The pressure foot 24 and the backup pad 32 squeeze and hold tightly the two parts 16 and 18 which comprise the workpiece which are to be joined together. After clamp-up has been achieved, such as shown in FIG. 2b, the drill is then brought to the surface 26 of the skin member 16 (FIG. 2c) and a hole is drilled (FIG. 2d) through both parts (16 and 18), with a countersink at a surface portion of the skin member. The drill is then withdrawn. A countersink head bolt 33 is then inserted into the opening, as shown at FIGS. 2e and 2f.

Figure 3A:
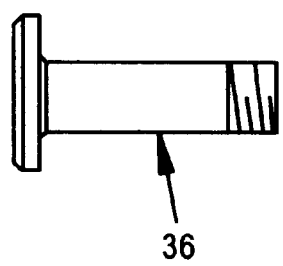
FIG. 3 is a series of views showing the insertion of a bolt into a workpiece arrangement.
Figure 3B:
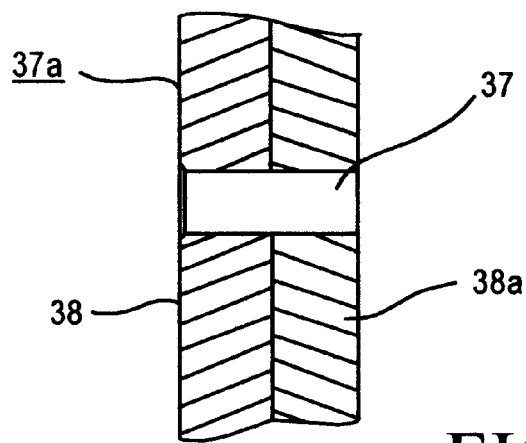
Figure 3C:
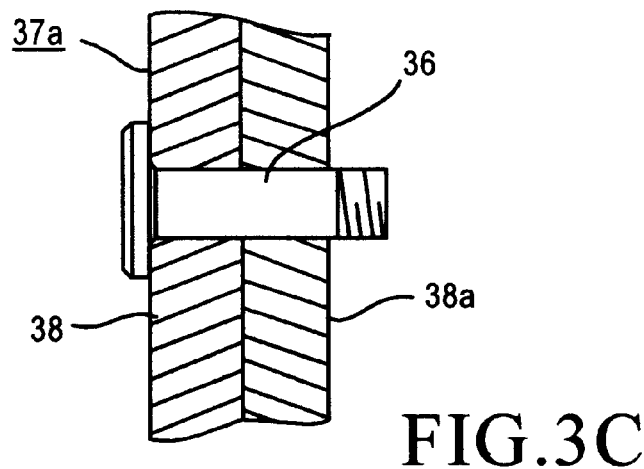

FIGS. 3a–3b show a protruding head bolt 36 inserted into a previously drilled opening 37 through two parts 38, 38a, the opening having a chamfer at the outer surface of the skin member, to accommodate the configuration of the bolt (FIG. 3b). The protruding head bolt 36 is then inserted, as shown in FIG. 3c; if the drilled chamfer is correct, a slight interference fit results between the underside of the head of the bolt and the skin surface 37a of the workpiece. The slight interference is desired and results if the chamfer is very accurately cut.

Figure 4A:
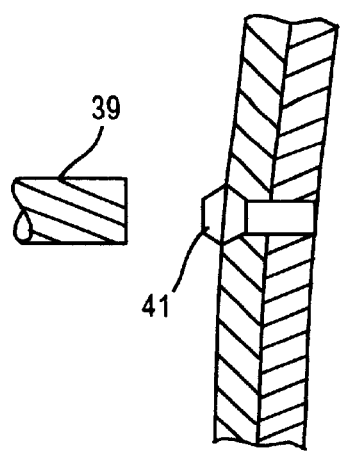
FIG. 4 is a series of views showing the shaving of a rivet head flush with the skin surface.
Figure 4B:
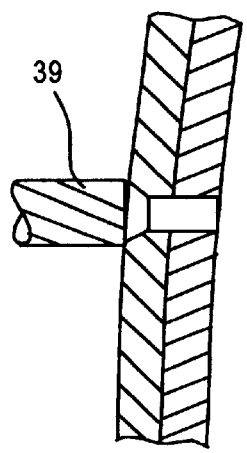
Figure 4C:
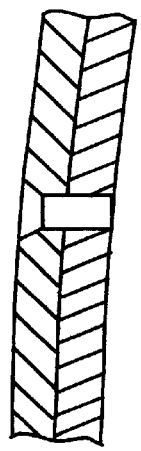

FIGS. 4a–4c show a rivet shaving operation in which a shaving tool 39, rotating at a high speed, shaves off the exposed head 41 of a rivet as the spindle assembly is moved through its predetermined controlled stroke. FIG. 4c shows the completed shaved surface of the rivet.

As indicated above, it is important that drilling and shaving operations be performed to an exceptionally tight tolerance. Also as indicated above, the drill countersink and drill chamfer machine operations are typically performed by a tool held in one spindle portion of the spindle assembly, while the shaving operation is accomplished by a tool positioned in a second, adjacent spindle portion of the spindle assembly. A typical tolerance for a countersink/chamfer will be ±0.0015, which is the tolerance for the flushness of the installed bolt minus the manufacturing tolerance of the bolt. In the case of shaving, the tolerance is ±0.001 inches. These tolerance values can be changed, however. They are provided as examples only.

The accuracy of the countersink operation depends upon the apex position of the end (tip) of the drill-countersink cutter and the accuracy of the shaving operation depends upon the apex position of the end face of the shaving cutter. In each case, it is the position of the far (distal) end of the cutting tool which is important. Knowing the tip position will be a very good indication of the correct "skin line" position of the countersink portion of the drill, resulting in the desired accurate countersink. The apex position can vary because of various mechanical as well as thermal factors. Miscellaneous mechanical factors include a number of different factors that cause small variations in the distance from the spindle linear scale mounting to the intersection of the center axis of the cutting tool with the skin surface of the workpiece through the aperture in the pressure foot. These factors include (1) errors in the normality of the pressure pad relative to the skin surface of the workpiece, (2) curvature of the skin surface relative to the pressure pad, (3) deflection/rotation of the pressure pad due to clamping load, and (4) chips and/or other debris between the pressure foot and the skin surface.

Thermal errors are due to growth in the various portions of the spindle assembly, including the ballscrew feed, the spindle housing, the shaft, the tool holder and the cutting tool.

Extremely accurate spindle feed mechanisms can be employed with a linear scale of one micrometer resolution for indicating spindle position to the CNC computer. The CNC control computer for the spindle assembly has the ability to accurately control the apex of motion and to make the small incremental adjustments in the apex of the spindle stroke as required to compensate for miscellaneous mechanical as well as thermal errors; however, the amount of compensation must be first determined. In the present invention, as discussed in detail hereinafter, there are several embodiments for accomplishing this determination of mechanical errors and/or thermal growth.

Figure 5A:
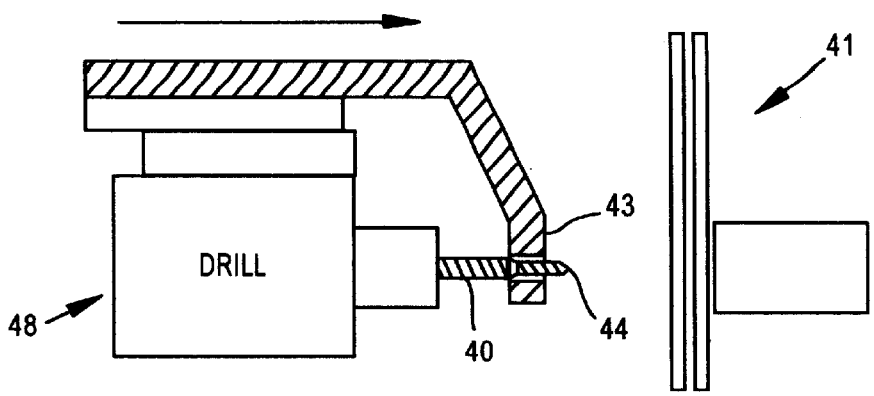
FIG. 5 is a simplified elevational view of one embodiment of the compensation system of the present invention.
Figure 5B:
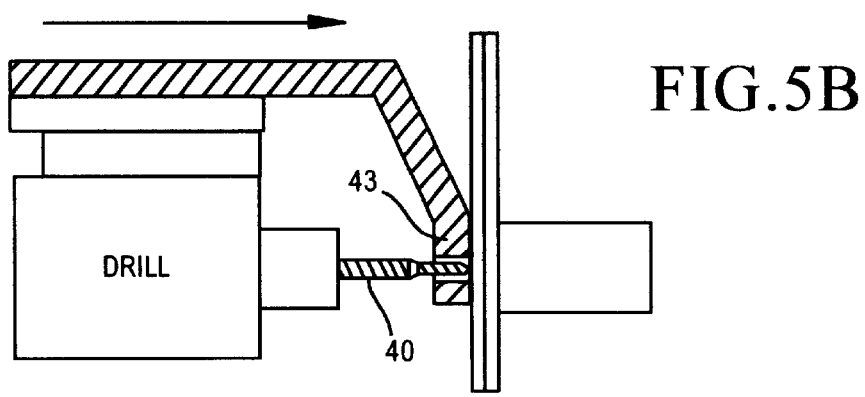
Figure 5C:
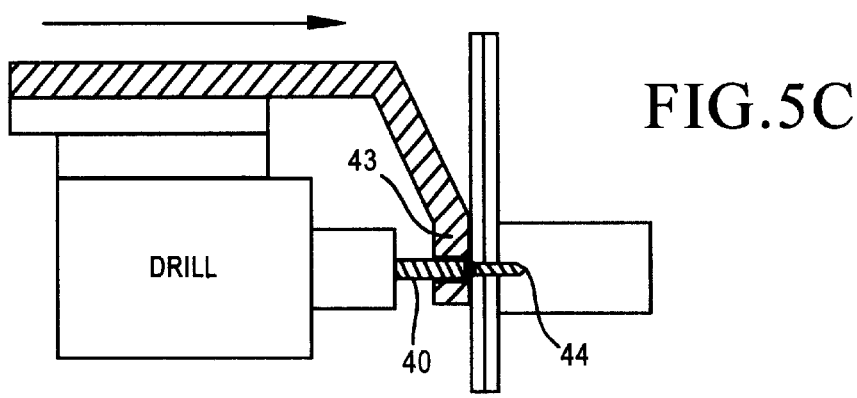

First, errors (mechanical and thermal) in the drilling spindle stroke are compensated by the arrangement of FIG. 5. The first step in error compensation involves the determination of a nominal relative position for the cutting tool and the workpiece. This can be done by measurement and calculation relative to the fixture for holding the workpiece, or it can be by cutting (drilling) a hole in a test member held by the fixture and then adjusting the stroke of the tool so as to produce the correct cut, e.g. countersink. This position of the tool is referred to as the nominal or reference position.

In the compensation embodiment of FIG. 5, drill (tool) 40 is initially moved toward the workpiece 41 until the tip 44 thereof is positioned beyond the forward edge of the pressure foot 43. In this position, prior to pressure foot 43 being moved to produce clamp-up, drill 40 is not rotating. At this point, the "thrust" on the drill feed mechanism in the spindle assembly 48 is reduced substantially, so that drill 40 can be readily moved relative to the remainder of the spindle assembly, toward and away from the workpiece, without significant effort/pressure, while the remainder of the spindle assembly remains stationary. The pressure foot 43 with the spindle assembly is then moved forwardly in a typical clamp-up operation. Prior to contact being achieved between pressure foot 43 and the skin member of the workpiece, tip 44 of the drill contacts the rear surface 45 of the skin member. The pressure foot continues to be moved toward the workpiece, with the spindle assembly. The lack of significant thrust on the drill, however, results in the drill and drill holder now remaining essentially stationary, as the rest of the assembly and the pressure foot move toward the workpiece.

This movement continues until the pressure foot 43 abuts the workpiece; the tip of the drill remains against the workpiece during movement of the pressure foot. The low thrust prevents the tip of the drill from significantly indenting the surface of the workpiece during this process. Any slight indentation which occurs is generally a constant and is taken into consideration by the CNC control computer. It (the tip) will remain in contact with the workpiece. When clamp-up is completed, with the desired clamp-up pressure achieved, the precise position of the drill is determined and recorded. This position of the drill is then subtracted from the previously known nominal position of the drill relative to the workpiece. This difference is referred to as δZ, or in this case, since it is the drilling spindle (the first spindle) being used, it is more precisely referred to as δZ1. The stroke of the spindle is then corrected accordingly by the CNC control computer to produce a very accurate countersink.

The thrust on the drill is now increased back to normal, and the spindle is operated, with the drill being moved forwardly under servo control to drill the hole.

The apex (farthest point) of the spindle stroke, as indicated above, has now been corrected for δZ1. This δZ1, however, is total δZ1, i.e. it includes corrections for both mechanical and thermal errors. Since the drill is in a "ready" position during the clamp-up sequence, while corrections for δZ1 are carried out, drilling can commence immediately when clamp-up is complete.

The arrangement of FIG. 5 thus corrects errors in the relative position of the drill and the workpiece which are significant for drilling operations. It uses a contact between the tip of the drill and the skin surface of the workpiece to produce ultimately a value of the apex of spindle stroke which produces the desired countersink in the workpiece, i.e. very accurate drilling operations.

Figure 6A:
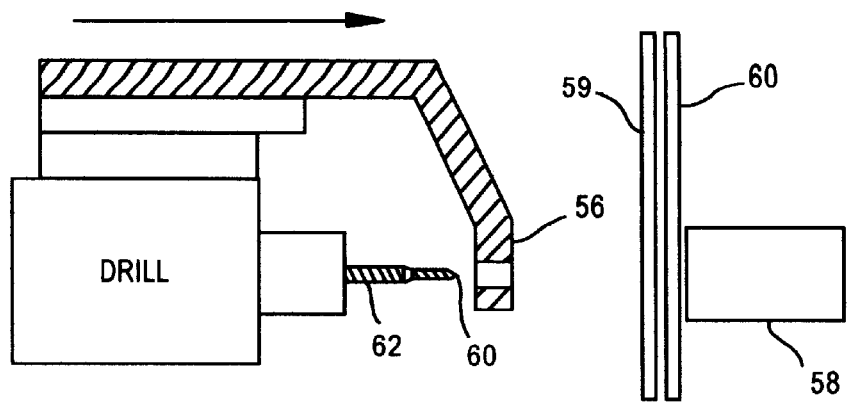
FIG. 6 shows another embodiment of the compensation system of the present invention.
Figure 6B:
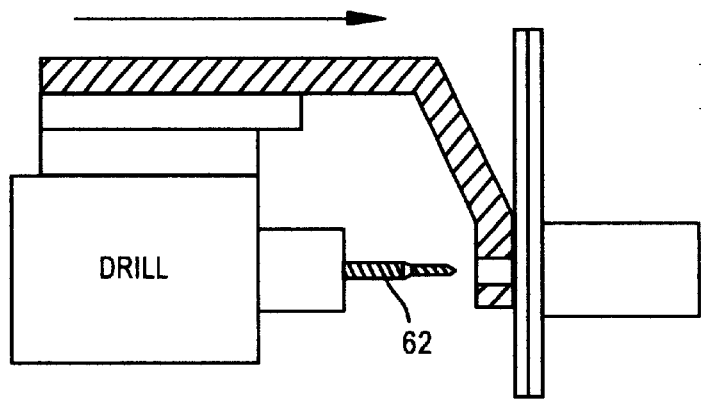
Figure 6C:
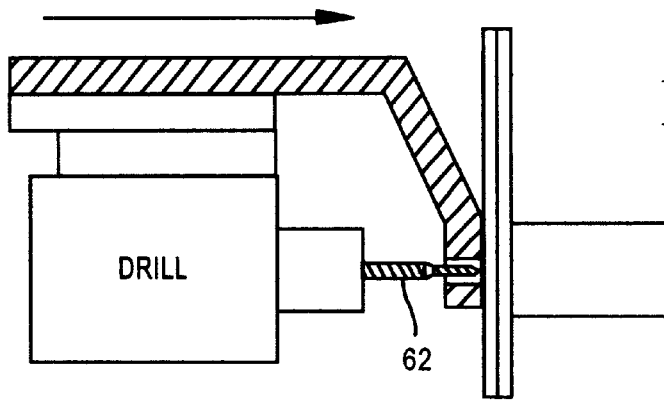

A modification of the embodiment of FIG. 5 is shown in FIG. 6. In this modification, clamp-up is first accomplished in the usual fashion, such as shown in FIGS. 6a and 6b, in which the combination of pressure foot 56 and backup pad 58 squeeze the parts 59, 60 together with the desired pressure. The nominal, reference position of the drill is then obtained, through measurement or use of a test coupon (member). The drill is then moved along its stroke path by the spindle servo-controlled feeder arrangement to the point where tip 60 of tool 62 just contacts the rear surface of the skin member of the workpiece. At this point, the position of the drill is determined and recorded and adjustments to the apex of the spindle stroke are made, if necessary, by the control computer to produce the desired cut (countersink) in the workpiece. While this embodiment also uses a contact between the tip of the drill and the skin surface to produce the necessary correction/compensation, the determination is accomplished only after clamp-up has been completed, resulting in somewhat slower drilling operation time.

Figure 7A:
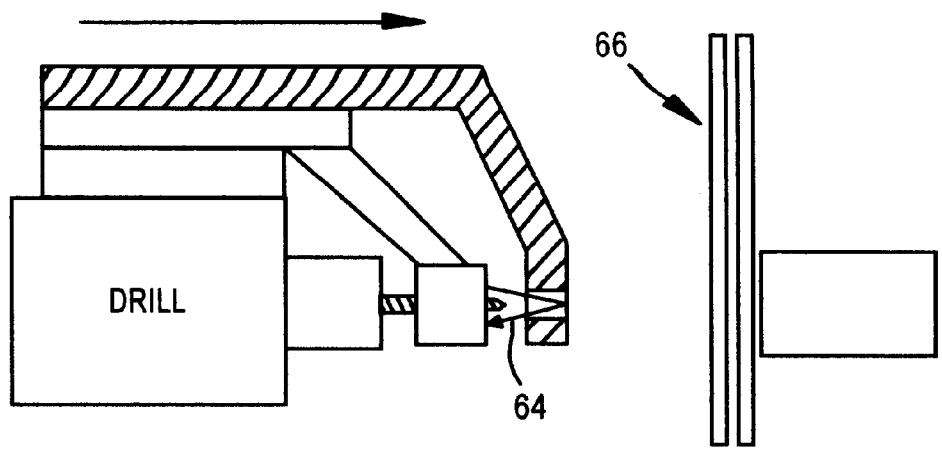
FIG. 7 shows a further embodiment of the compensation system of the present invention.
Figure 7B:
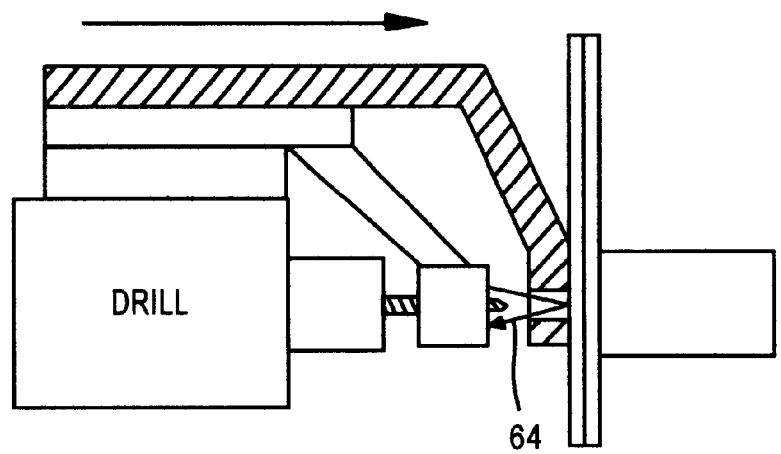

FIG. 7 shows still another embodiment for determining drill errors. In this case, a non-contact laser or ultrasonic sensor is used to direct a signal 64 to the skin surface 66 of the workpiece to determine the position of the drill relative to the actual workpiece, again after a nominal (reference) position has been determined. Correction to the stroke is then made by the control computer. This embodiment also results in accurate drilling of countersink openings, within the desired tolerances. This embodiment also has the advantage of having the compensation determination completed when clamp-up is complete, like that of FIG. 5, and therefore permits the machine to operate without delay. It is, however, uncertain whether or not this system can in fact be used with the drill in a "ready" position, and therefore such an embodiment at the present time is not quite as advantageous as the embodiment of FIG. 5. Furthermore, this embodiment is possibly not quite as accurate as the above-described embodiments with presently available spot laser/sensors, and also compensates only for mechanical errors.

Figure 8A:
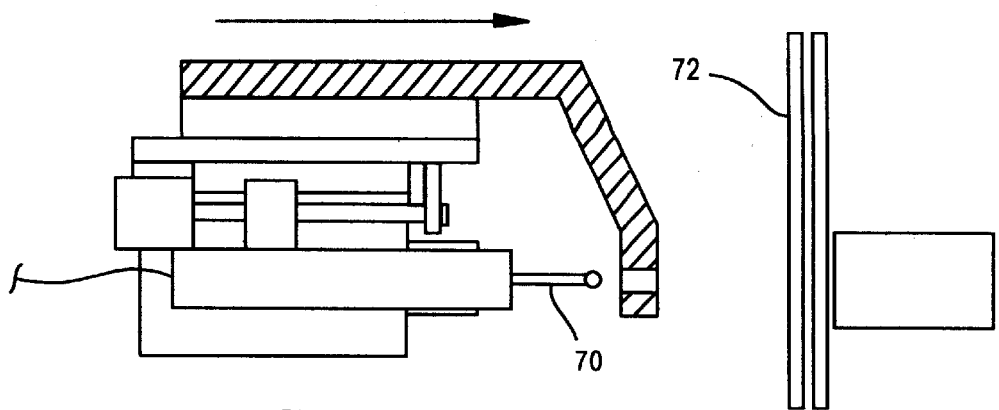
FIG. 8 shows a still further embodiment of the compensation system of the present invention.
Figure 8B:
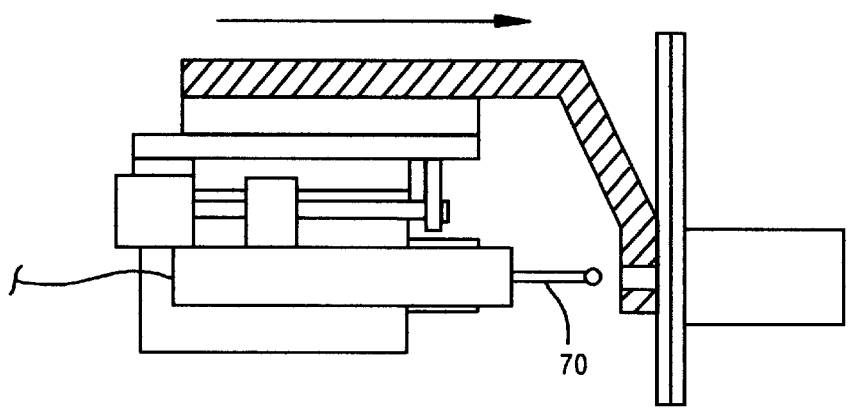
Figure 8C:
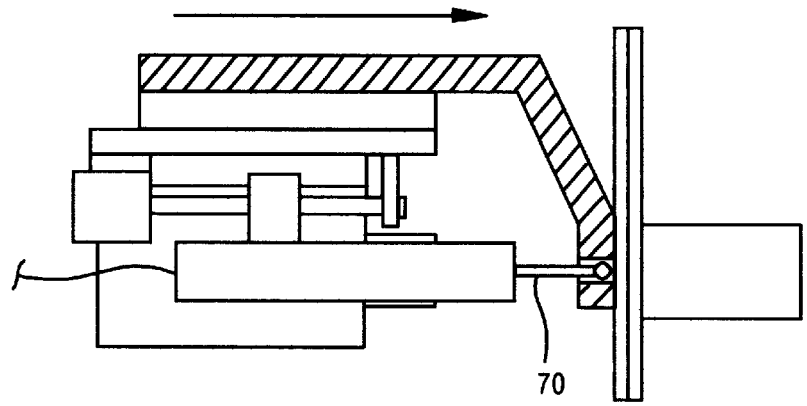
Figure 9A:
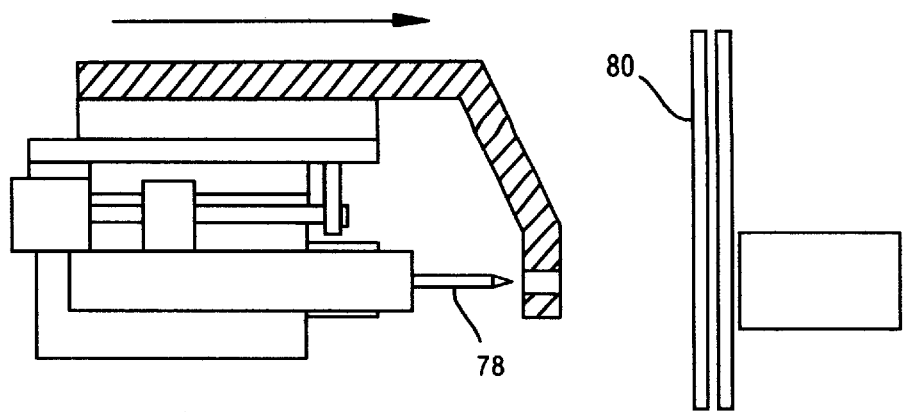
FIG. 9 shows yet another embodiment of the compensation system of the present invention.
Figure 9B:
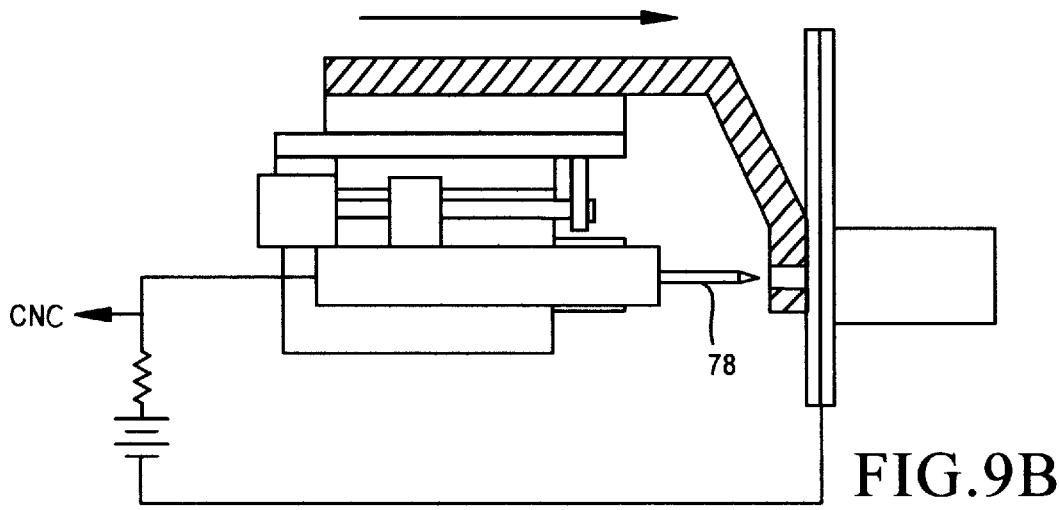
Figure 9C:
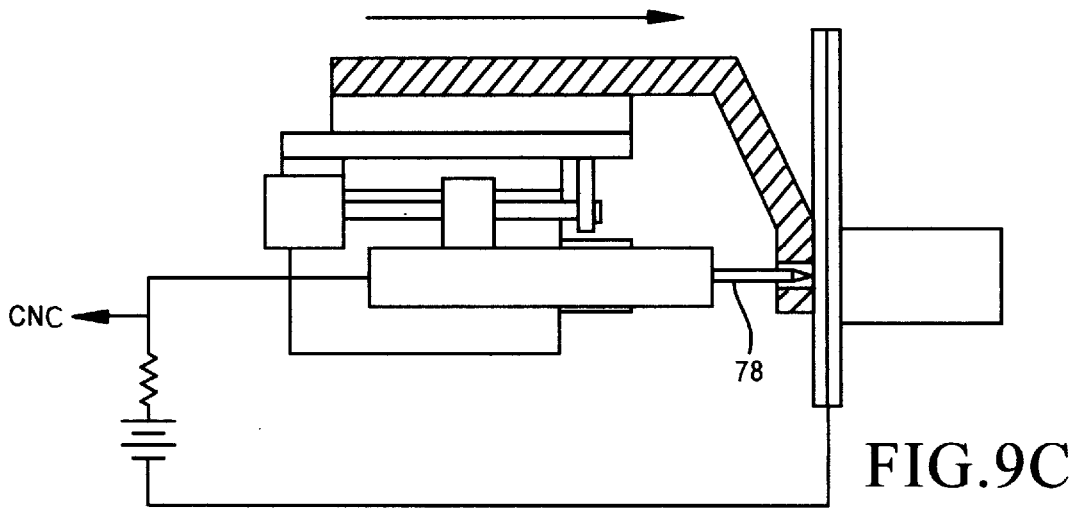

Additional embodiments for compensating for mechanical errors only are shown in FIGS. 8 and 9. In one case (FIG. 8), a mechanical touch probe 70 is driven forward to touch the skin surface of the workpiece 72. Clamp-up is shown completed in FIG. 8b. The probe touch is shown in 8c. The system then makes adjustments, if necessary, to the spindle stroke, based on the touch of the probe with the workpiece, relative to a previously determined nominal drill position.

In FIG. 9, an electrical probe 78 is moved forward to workpiece 80, after the pressure foot has contacted the skin surface of the workpiece 80, to produce an electrical ground connection. The position of the probe is determined and adjustment is made to the spindle stroke by the control computer. Both of these embodiments (FIGS. 8 and 9) are capable of compensating for miscellaneous mechanical errors only, however, and cannot compensate for thermal growth of the spindle shaft, which can, however, be done by the preferred embodiment of FIG. 5.

The embodiment of FIG. 5 is both highly accurate and efficient, because the drill bit can come into contact directly with the skin surface of the workpiece during clamp-up. Compensation for the drill spindle can thus be determined directly because of this direct contact.

However, compensation for errors in the apex position of a shave spindle (mounted in the second spindle), cannot be determined directly, because a physical contact between the tool and the skin surface of the workpiece cannot be made. This is due to the presence of the rivet head which is to be shaved. Hence, a somewhat different system is used to determine shave spindle compensation. It is still desirable to obtain compensation for both miscellaneous mechanical errors, referred to hereafter as $\delta 2ZM$, and thermal errors, referred to hereafter as $\delta 2ZT$. $\delta 2Z$ (total compensation for the second spindle) will thus equal $\delta 2ZM+\delta 2ZT$. Since $\delta 2Z$ cannot be determined directly, by touch-off with the skin of the workpiece, it must be calculated.

The method of calculation described herein recognizes that the first spindle, i.e. the drill countersink spindle, even though its compensation is determined with a touch-off approach, has a total compensation of $\delta 1Z=\delta 1ZM+\delta 1ZT$, or expressed in an equivalent manner, $\delta 1ZM=\delta 1Z-\delta 1ZT$.

Although it is unknown as to what portion of $\delta 1Z$ is due to thermal effects and what is due to mechanical effects, it is reasonable to assume that because of the clamp-up process and the fact that both spindles in effect have the same pressure foot and workpiece, which are held rigidly, that the mechanical compensation factor should be the same for both the drill and the shave spindles (i.e. $\delta 2ZM=\delta 1ZM$); hence, $\delta 2ZM=\delta 1Z-\delta 1ZT$. The total compensation for the second spindle (the shaving spindle) is thus $\delta 2Z=\delta 1Z+[\delta 2ZT-\delta 1ZT]$. From this equation, it is clear that the total compensation for the shave spindle can be accomplished by starting with the total compensation previously obtained via the touch-off process for the drill spindle ($\delta 1Z$), adding the thermal compensation for the second spindle ($\delta 2ZT$), which must be determined, and then subtracting the thermal compensation for the first spindle ($\delta 1ZT$), which also must be determined. The thermal compensation for both spindles becomes critical in the determination of the total compensation for the second spindle.

Figure 10:
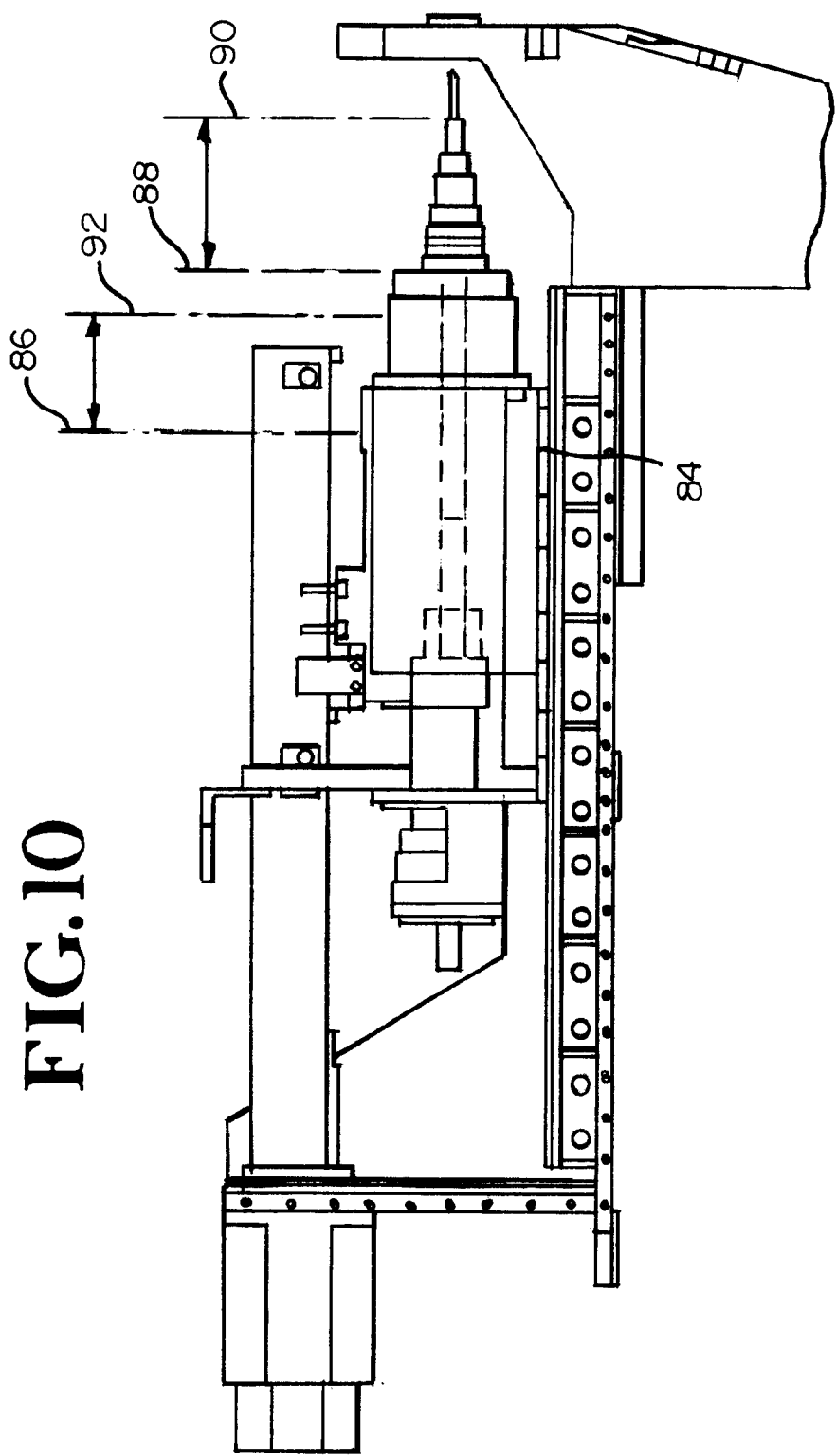
FIG. 10 shows an elevational view of the drilling/rivet shaving system.

In order to achieve the best results, it is beneficial to implement the best design and to minimize the amount of thermal compensation necessary for each spindle. FIG. 10 illustrates generally the overall spindle structure which includes the present invention. A linear scale readhead, shown at 84, is used in the spindle feed. This eliminates the need for compensation of thermal growth for that portion of the spindle assembly behind (to the rear of) the readhead mount. Hence, the readhead is usually mounted as far forward as practical, in this case approximately 4 inches from the angular contact bearings which provide support for the spindle shaft. Due to the location of the readhead mounting, everything behind line 86 in FIG. 10 of the spindle assembly requires no thermal compensation.

The portion of the spindle assembly forward of line 92, which includes the shaft, tool holder and tool and is typically approximately six inches in length, is subject to a cooling effect as the shaft rotates. About five inches of the six-inch length is forward of line 88 and is directly exposed to the cooling effect of air; the remaining one inch extends from the face of the front endbell at line 88 to the angular contact bearings at line 92. This one-inch section is also subject to heating and then cooling by air conduction. The total six inch portion between lines 92 and 90 heats up when the spindle stops turning. Thermal growth in this area is very difficult to determine, although it is significant, since the coefficient of expansion of steel is 8 microinch per/in/° F.

The temperature of the tool holder and the tool will vary over a 30° range fairly quickly as the tool holder alternately spins and stops, resulting in 0.0012" length variation. This in itself is over one-half of the allowed shaving tolerance of ±0.001.

As indicated above, however, both the drill spindle shaft and the shave spindle shaft operate at the same time. Hence, these same portions of the two spindles are assumed to have sympathetic thermal growth, because the two spindles have similar lengths and temperatures. The touch-off process with the first spindle (the drill spindle) is used to approximately compensate the thermal growth of the tool holder and tool portions of the second spindle, although it is not exact.

Hence, since the linear scale readhead takes care of any errors from the angular contact bearings rearwardly of the spindle assembly, and since the thermal growth of the spindle shaft from the angular contact bearings (line 92) forward is known by virtue of the touch-off process for the drill, the only compensation remaining is for growth errors in the intermediate area, i.e. between lines 86 and 92 along the length of the spindle assembly.

This error is calculated as follows in the embodiment shown. Thermocouples are mounted on the front endbell portions of each spindle. The resulting correction factor thus is $\delta 2Z = \delta 1Z + (T2CF2 - T1CF1)$, where CF1 is the thermal correction factor for the first spindle, CF2 is the thermal correction factor for the second spindle, T1 is the temperature of the first spindle front endbell and T2 is the temperature of the second spindle front endbell. If the two spindles have similar geometry and comprise similar material, CF1=CF2.

The correction factor for an aluminum spindle body is $1.3 \times 10^{-5}$ in/in/° F., while the correction factor for a steel front endbell up to the anchor point of the angular contact bearings is $0.8 \times 10^{-5}$ in/in/° F. Hence, the value of CF in the present case where the spindle body is 1.5 inches and the front endbell is 2.5 inches is $1.5 \times (1.3 \times 10^{-5}$ in/in/° F.$+ 2.5 \times (0.8 \times 10^{-5}$ in/in/° F.$) = 4 \times 10^{-5}$ in/in/° F. In practice, the correction factor is established by testing but the resulting value is close to the calculated value.

Hence, using the above correction factors and the measured temperature values at the endbells, the growth for the intermediate portion of the spindle can be calculated. Adding this calculation to the touch-off determination for the drill spindle produces a total growth compensation for the second spindle, i.e. the shave unit. This value can then be used by the control computer to appropriately adjust the apex of the stroke of the second spindle.

Hence, the present invention provides a determination and compensation for mechanical and thermal errors which affect the apex of the spindle stroke for both the drill and shave spindles. The control computer, once the errors have been determined, provides a corresponding adjustment for the apex of the spindle stroke. High accuracy for the drilling and shaving operations results.

Although a preferred embodiment, as well as alternative embodiments, are disclosed herein, it should be understood that various changes, modifications, and substitutions may be incorporated in such embodiments without departing from the spirit of the invention which is defined by the claims which follow.

What is claimed is:

1. An apparatus for performing accurate machine operations on mechanical assemblies, comprising:
    a first spindle for holding a cutting tool for performing very accurate machine cutting operations on a workpiece, wherein an initial nominal position of the cutting tool relative to the workpiece is known;
    a moving assembly for moving the first spindle toward and away from a workpiece which comprises at least two workpiece elements to be joined together, the workpiece having a near surface relative to the cutting tool, wherein the cutting tool has an initial apex position in its movement relative to the workpiece determined by said initial nominal position of the cutting tool;
    a pressure foot assembly for clamping the workpiece elements and stabilizing them in a fixed position, the pressure foot assembly having an aperture through which the cutting tool can move to contact the workpiece;
    a position determining system for identifying the position of the cutting tool following contact between a tip of the cutting tool and the near surface of the workpiece after clamping of the workpiece by the pressure foot assembly has occurred and before drilling begins; and
    means for adjusting the initial apex position of the cutting tool in accordance with the identified position of the cutting tool to achieve a very accurate cutting operation in the workpiece.

2. An apparatus of claim 1 wherein the second spindle is for rivet shaving operations.

3. A method for performing accurate machine operations on mechanical assemblies with an apparatus which includes a first spindle for holding a cutting tool for performing very accurate machine cutting operations, comprising the steps of:
    obtaining an initial nominal position of the cutting tool relative to the workpiece;
    moving the first spindle toward and away from a workpiece which comprises at least two workpiece elements to be joined together, the workpiece having a near surface relative to the cutting tool, whereas the cutting tool has an initial apex position in its movement relative to the workpiece determined by said initial nominal position of the cutting tool;
    clamping the workpiece elements and stabilizing them in a fixed position with a pressure foot assembly, the pressure foot assembly having an aperture through which the cutting tool can move to contact the workpiece;
    determining the position of the cutting tool following contact between a tip end of the cutting tool and the near surface of the workpiece after clamping of the workpiece by the pressure foot assembly has occurred and before drilling begins; and
    adjusting the initial apex position of the cutting tool in accordance with the determined position of the cutting tool to achieve a very accurate cutting operation in the workpiece.

4. An apparatus for performing accurate machine operations on mechanical assemblies, comprising:
    a first spindle for holding a cutting tool for machine operations;
    a pressure foot assembly for clamping a workpiece comprising at least two workpiece elements;
    a moving assembly for moving the first spindle to a point forward of the pressure foot;
    means for moving the pressure foot forward to clamp the workpiece, wherein the first spindle and the cutting tool move forwardly with the pressure foot;

thrust control for the first spindle, permitting selective reduction of thrust such that, as the pressure foot moves toward and clamps the workpiece, a tip of the cutting tool, after initial contact with a near surface of the cutting tool, maintains contact with the workpiece but does not indent the assembly;

means for determining the relative position of the workpiece and the cutting tool upon completion of clamping; and means for adjusting the apex position of the cutting tool in accordance with said determination to achieve very accurate cutting of the workpiece.

5. An apparatus of claim 1, wherein the adjusting means includes a control computer which automatically adjusts the apex position of the cutting tool.

6. An apparatus of claim 1, wherein the first spindle is not turning the cutting tool during the time of the clamping of the workpiece elements and the identification of the position of the cutting tool.

7. An apparatus of claim 1, wherein the cutting tool is positioned for machine operations during clamping of the workpiece elements by the pressure foot and during the identification of the position of the cutting tool.

8. An apparatus of claim 1, wherein the determination of the near position of the workpiece accommodates both mechanical errors between the pressure foot and the near surface of the workpiece and thermal growth of the spindle.

9. An apparatus of claim 1, wherein the apparatus includes a second spindle having similar thermal characteristics to the first spindle, wherein the first spindle is for drilling operations and the second spindle is for a different operation from drilling, wherein the apparatus further includes means for obtaining the thermal growth for the second spindle without using an element mounted on the second spindle for contact with the near surface of the workpiece.

10. An apparatus of claim 9, including means for determining the thermal growth of a first portion of the first spindle exposed to a cooling air effect when the spindle is turning and means for obtaining thermal growth for a second portion of the second spindle, the thermal growth determining means for the second portion of the second spindle including temperature obtaining members positioned on the second portion of the second spindle and on a corresponding second portion of the first spindle, the apparatus further including calculation means, using known growth factors for the material used in the respective second portions, to determine the thermal growth of the second portion of the second spindle and thereby obtain thermal growth for the entire second spindle.

11. An apparatus of claim 4, wherein the apparatus includes a control computer for automatically adjusting said apex position of the cutting tool.

12. An apparatus of claim 4 wherein the clamping of the workpiece by the pressure assembly and the determination of the relative position of the cutting tool and the workpiece are made when the cutting tool is not turning.

13. An apparatus of claim 4, wherein the tool is in position for machine operations during clamp-up and the determination of position of the tip of the tool.

14. An apparatus of claim 4, including first and second spindle portions, the first spindle including a tool for drilling operations the second spindle including a tool for shaving operations, the apparatus further including means for obtaining the thermal growth for the second spindle portion.

15. A method of claim 3, wherein the step of adjusting is carried out automatically using a control computer.

16. A method of claim 3, wherein the apparatus includes a second spindle having similar thermal characteristics to the first spindle, wherein the first spindle is for drilling operations and the second spindle is for a different operation than drilling, wherein the method includes the step of obtaining the thermal growth for the second spindle without using an element mounted on the second spindle for contact with the near surface of the workpiece.

17. A method of claim 16, including the step of determining the thermal growth of a first portion of the first spindle exposed to a cooling air effect when the spindle is turning and means for obtaining thermal growth for a second portion of the second spindle, the thermal growth for the second portion of the second spindle being obtained by temperature obtaining members positioned on the second portion of the second spindle and on a corresponding second portion of the first spindle, the method further including the step of calculating, using known growth factors for the material used in the respective second portions, the thermal growth of the second portion of the second spindle so as to obtain thermal growth for the entire spindle.

18. A method of claim 16, wherein the second spindle is for rivet shaving operations.

19. An apparatus of claim 14, including means for obtaining the thermal growth of a forward portion of the first spindle and means for using said obtained thermal growth to compensate for the thermal growth of the second spindle.

* * * * *